No. 877,498. PATENTED JAN. 28, 1908.
J. P. GILMAN.
MOISTENER.
APPLICATION FILED AUG. 24, 1907.

WITNESSES:
Thos. W. Riley
W. H. Scammell.

INVENTOR
J. P. Gilman
BY
W. J. FitzGerald & Co.
Attorneys

UNITED STATES PATENT OFFICE.

JOSEPH P. GILMAN, OF RICEVILLE, IOWA.

MOISTENER.

No. 877,498.  Specification of Letters Patent.  Patented Jan. 28, 1908.

Application filed August 24, 1907. Serial No. 389,965.

*To all whom it may concern:*

Be it known that I, JOSEPH P. GILMAN, a citizen of the United States, residing at Riceville, in the county of Mitchell and State of Iowa, have invented certain new and useful Improvements in Moisteners; and I do hereby declare the following to be a full, clear, and exact description of the invention, such as will enable others skilled in the art to which it appertains to make and use the same.

My invention relates to new and useful improvements in moisteners and more particularly to that class adapted to be used for moistening cigars, or the like, and my object is to provide a device of this class, whereby one or more boxes of the cigars may be moistened at one and the same time.

A further object is to provide an absorbent means for retaining the moisture and a still further object is to provide means for introducing moistening liquids into the moistener without disturbing the cigars placed therein.

Other objects and advantages will be hereinafter referred to and more particularly pointed out in the claims.

Figure 1:
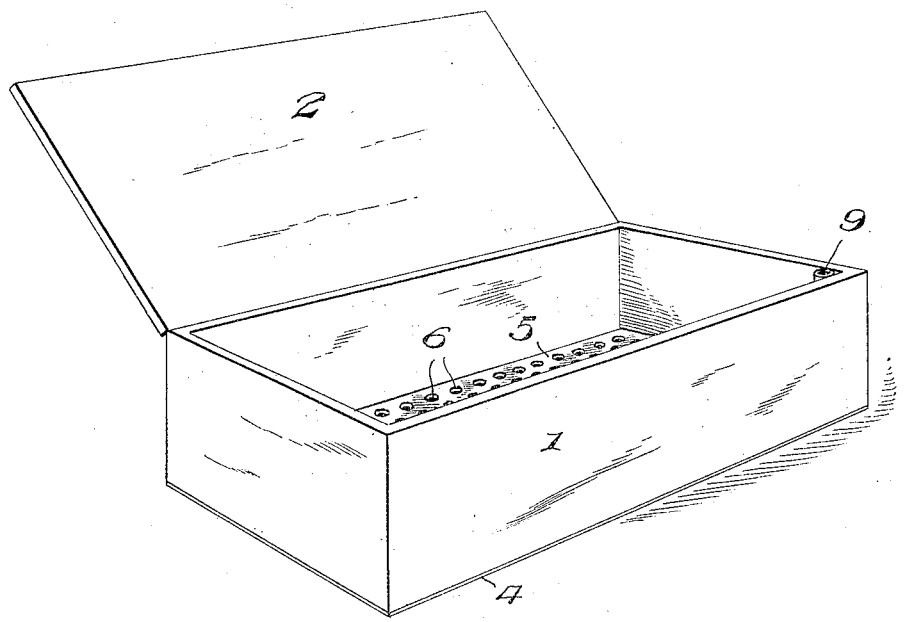
Figure 2:
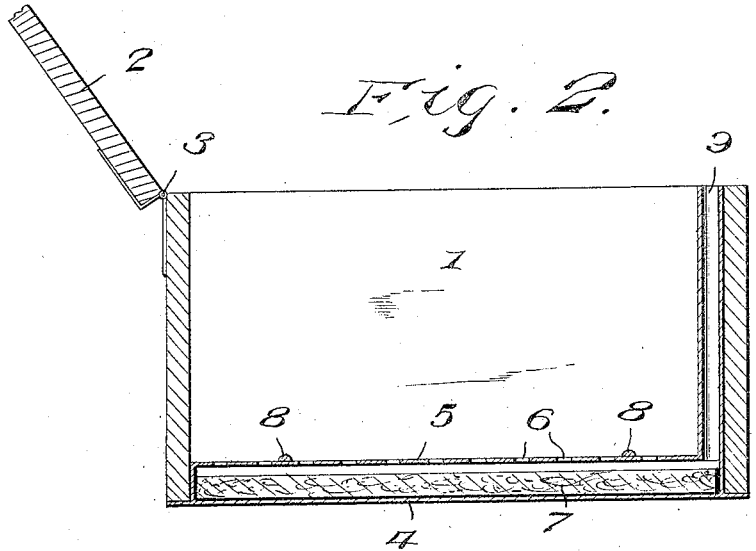

In the accompanying drawings which are made a part of this application, Figure 1 is a perspective view of my improved moistening box, showing the cover thereof in an open position, and, Fig. 2 is a transverse, sectional view through one end of the box.

Referring to the drawings in which similar reference numerals designate corresponding parts throughout the several views, 1 indicates a box, the walls of which may be constructed of wood, or any preferred material and 2 indicates a cover, which is secured to one edge of the box 1 by means of hinges 3.

The bottom 4 of the box is preferably formed of metal and is provided on its upper surface with a tank 5, the upper wall of the tank being provided with a plurality of openings 6, through which the moisture may pass into the body of the box 1 and in order to retain the moisture in the tank, a pad 7, formed of felt, or any suitable absorbent material, is placed in the tank 5 and inclosed thereby, so that by thoroughly saturating the pad with water, or other moistening fluids, the moisture will be retained in the tank for a considerable length of time, and, by providing the pad, the evaporation of the moistening fluid will be retarded.

In order to support the cigar boxes above the upper wall of the tank, so that the moisture may freely pass through the opening 6, two or more ribs 8 are formed by bending up portions of said wall, said ribs supporting the boxes slightly above the openings 6.

In order to introduce the moistening fluids into engagement with the pad 7, without having to remove the pad from the tank 5, a tube 9 is extended from the upper edge of the box 1 to the tank, the lower end of the tube 9 passing through the upper wall of the tank 5 and communicating with the interior thereof, so that the fluid will pass directly into engagement with the pad 7.

In use, the moistening fluid is introduced into the tank 5 until the pad 7 is thoroughly saturated, after which the cigars are placed in the box and the cover secured in position over the upper edge thereof and it will be readily seen that the moisture will percolate through the upper portion of the box and moisten the cigars.

While I have stated that the cigars are retained in the usual form of cigar box, when placed in the moistening box, it will be fully understood that, if desired, the cigars may be removed from the boxes and placed directly into the moistening box.

It will also be seen that a new supply of moistening fluid may be readily introduced into the tank, even when the box is filled with cigars.

What I claim is:

1. A device as described embracing a casing having a hinged cover, and an inner receptacle or tank containing an absorbent and provided with an upwardly extending filling tube with its upper end arranged at the upper edge of said casing, said tank having a foraminous top provided with upstanding studs or projections adapted to form a supporting surface for the objects to be moistened.

2. A device as described containing a casing having lateral wooden portions and a closure therefor, and an inner tank or receptacle having a foraminous upper surface, and an absorbent placed in said tank for delivering moisture through apertures formed by said foraminous top or upper surface of said tank, said tank also having an upwardly extending filling tube with its upper edge about flush with the corresponding edge of said casing.

In testimony whereof I have signed my name to this specification in the presence of two subscribing witnesses.

JOSEPH P. GILMAN.

Witnesses:
C. C. EARNIST,
F. L. ZILK.